(12) United States Patent
Bialic

(10) Patent No.: US 6,665,685 B1
(45) Date of Patent: Dec. 16, 2003

(54) DERIVING DATABASE INTERACTION SOFTWARE

(75) Inventor: Leah Jenney Bialic, Middleboro, MA (US)

(73) Assignee: Cambridge Soft Corporation, Cambridge, MA (US)

( * ) Notice: Subject to any disclaimer, the term of this patent is extended or adjusted under 35 U.S.C. 154(b) by 0 days.

(21) Appl. No.: 09/430,870

(22) Filed: Nov. 1, 1999

(51) Int. Cl.$^7$ .............................................. G06F 17/30
(52) U.S. Cl. ..................... 707/102; 707/104.1; 707/1; 345/968; 717/106
(58) Field of Search ........................... 707/1, 10, 100, 707/102, 104.1; 345/700, 968; 717/100, 106

(56) References Cited

U.S. PATENT DOCUMENTS

| | | | | |
|---|---|---|---|---|
| 5,418,944 A | * | 5/1995 | DiPace et al. .................. 707/3 |
| 5,778,377 A | * | 7/1998 | Marlin et al. ................ 707/103 |
| 6,023,659 A | * | 2/2000 | Seilhamer et al. ............ 702/19 |
| 6,038,562 A | * | 3/2000 | Anjur et al. ................... 707/10 |
| 6,119,104 A | * | 9/2000 | Brumbelow et al. .......... 186/37 |
| 6,128,619 A | * | 10/2000 | Fogarasi et al. ............. 707/102 |
| 6,189,013 B1 | * | 2/2001 | Maslyn et al. ............... 707/104 |
| 6,246,410 B1 | * | 6/2001 | Bergeron et al. ............ 345/357 |
| 6,295,514 B1 | * | 9/2001 | Agrafiotis et al. ............. 703/12 |
| 6,341,314 B1 | * | 1/2002 | Doganata et al. ........... 709/220 |
| 6,571,245 B2 | * | 5/2003 | Huang et al. .................. 707/10 |

* cited by examiner

*Primary Examiner*—Greta Robinson
*Assistant Examiner*—Debbie M. Le
(74) *Attorney, Agent, or Firm*—Hale and Dorr LLP

(57) ABSTRACT

A first set of computer software data is analyzed that specifies interaction with a database. From the first set of computer software data, a second set of computer software data is derived for interacting with the database. A text file version of a desktop database form file is produced, and the text file version is parsed to derive database interaction information. Results of the parsing include a virtual directory at the Web server that includes one or more text files known as "ini files" and one or more files for Web forms. Such an ini file includes information such as table relationship information and database connection information that is needed in the new Web application to display and search database data.

31 Claims, 25 Drawing Sheets

ChemMSDX wizard test
518 sample

FIG. 17

```
* CFW Form Definition                cfwoutput.txt

* FONT: height  style  name
* FBOX: boxtype  l  t  r  b  id  dtype  fntno  fldtype  fldname DSRC " "C:\wizard_test\wizard_test.MDB" " MolTable"
FONT 8 0 0 0 0 0 MS Sans Serif
FONT 10 0 0 0 0 Arial
FONT 8 700 0 0 0 Arial
```

```
FBOX 6" "23 411 306 542" "2001" "0" "0" "1" "MOL_ID" "C:\wizard_test\w
izard_test.MDB" "Synonyms" "SYN_ID" "Synonym"
SUBFORM 2001
* CFW Form Definition

* FONT: height style name
* FBOX: boxtype  l t r b  id   dtype  fntno  fldtype   fldname DSRC " "C:\samples\SAMPLE.MDB" " Synonyms"
FONT 8 0 0 0 0 MS Sans Serif
FONT 10 0 0 0 0 Arial
FONT 8 700 0 0 0 Arial FBOX 0" "12  12  72  60"  "2001" "0" "0" "1" "SYN_ID"
FBOX 0" "90  10 247  62"  "2002" "0" "0" "0" "Synonym"
END SUBFORM
FBOX 1" "12  12 315 187"  "2002" "1" "0" "0"
FBOX 4" "20  28 307 179"  "2003" "0" "0" "3" "Structure"    "Structure"
FBOX 1" "20 203 307 257"  "2004" "1" "0" "0"
FBOX 0" "28 219 299 249"  "2005" "0" "0" "5" "MolWeight"    "Molecular Weight"
FBOX 1" "21 268 307 328"  "2006" "1" "0" "0"
FBOX 0" "28 293 301 317"  "2007" "0" "0" "0" "Molname"      "Molecule Name"
FBOX 1" "21 339 309 399"  "2008" "1" "0" "0"
FBOX 5" "29 355 301 391"  "2009" "0" "0" "4" "Formula"      "Formula"
```

FIG. 20B

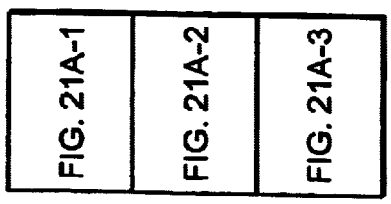

FIG. 21A

```
wizard_test (1).ini

[GLOBALS]
ABOUT_WINDOW=wizard_test
DISPLAY_NAME=wizard_test
MAXHITS=100
CFW_INSTANCE=new
DB_RECORD_COUNT=288
DB_TYPE=STRUC
TABLE_ALIASES=MolTable,Synonyms
SUBFORM_VIEW_NAMES=NULL
ADO_CONNECTION_NAMES=base_connection
CHEM_CONNECTION_NAMES=base_cfw_form
TABLE_GROUPS=base_table_group
FORM_GROUPS=base_form_group,basenp_form_group,gs_form_group,add_record
_form_group,drill_down_form_group
FIELD_MAP_GROUPS=gs_field_map_group
```

FIG. 21A-1

```
[MOLTABLE]
TABLE_NAME=MolTable
RELATIONAL_FIELDS=Molname;0
PRIMARY_KEY=MOL_ID
SQL_SYNTAX=ACCESS
SELECT_KEYWORD=DISTINCT
SELECT_ADDITIONAL=NULL
SELECT_JOIN=MolTable.MOL_ID
SELECT_LINKS=MolTable.MOL_ID;1,MolTable.MOL_ID;1
INTER_TABLES=NULL
ADO_CONNECTION=base_connection
CHEM_CONNECTION=base_cfw_form
STRUC_FIELD_ID=MOL_ID
```

FIG. 21A-2

```
[SYNONYMS]
TABLE_NAME=Synonyms
RELATIONAL_FIELDS=SYN_ID;1,Synonym;0
PRIMARY_KEY=SYN_ID
SQL_SYNTAX=ACCESS
SELECT_KEYWORD=NULL
SELECT_ADDITIONAL=NULL
SELECT_JOIN=Synonyms.SYN_ID=MolTable.MOL_ID
SELECT_LINKS=Synonyms.SYN_ID;1,MolTable.MOL_ID;1
INTER_TABLES=MolTable
ADO_CONNECTION=base_connection
CHEM_CONNECTION=NULL
STRUC_FIELD_ID=NULL

[BASE_CONNECTION]
CONN_TYPE=DBQ
CONNECTION_STRING=C:\wizard_test\wizard_test.MDB;Driver={Microsoft Access Driver (*.mdb)};DriverId=25;FIL=MS Access;
CONNECTION_TIMEOUT=30
COMMAND_TIMEOUT=30
```

FIG. 21A-3

```
wizard_test (1).ini

CONNECTION_USERNAME=""
CONNECTION_PASSWORD=""

[BASE_CFW_FORM]
STRUC_ENGINE=CFW
STRUC_FORM_NAME=wizard_test
STRUC_DB_PATH=C:\wizard_test\wizard_test.MDB
STRUC_TABLE_NAME=MolTable

[BASE_TABLE_GROUP]
BASE_TABLE=MolTable
MOLECULE_TABLE=MolTable
TABLE_SQL_ORDER=MolTable,Synonyms
```

```
[BASE_FORM_GROUP]
INPUT_FORM_PATH=wizard_test_input_form.asp
INPUT_FORM_MODE=search
RESULT_FORM_PATH=wizard_test_result_list.asp
RESULT_FORM_MODE=list
PLUGIN_VALUE=True
STRUCTURE_FIELDS=MolTable.Structure
FORM_GROUP_FLAG=SINGLE_SEARCH
MW_FIELDS=MolTable.MolWeight
FORMULA_FIELDS=MolTable.Formula
SEARCHABLE_ADO_FIELDS=MolTable.Molname;0,Synonyms.SYN_ID;1,Synonyms.Synonym;0
REQUIRED_FIELDS=NULL
SDFILE_FIELDS=NULL
TABLE_GROUP=base_table_group
NUM_LIST_VIEW=5
```

FIG. 21B-2

```
[BASENP_FORM_GROUP]
INPUT_FORM_PATH=wizard_test_input_formnp.asp
INPUT_FORM_MODE=search
RESULT_FORM_PATH=wizard_test_result_list.asp
RESULT_FORM_MODE=list
PLUGIN_VALUE=False
STRUCTURE_FIELDS=NULL
FORM_GROUP_FLAG=SINGLE_SEARCH
MW_FIELDS=MolTable.MolWeight
FORMULA_FIELDS=MolTable.Formula
SEARCHABLE_ADO_FIELDS=MolTable.Molname;0,Synonyms.SYN_ID;1,Synonyms.Synonym;0
REQUIRED_FIELDS=NULL
SDFILE_FIELDS=NULL
TABLE_GROUP=base_table_group
NUM_LIST_VIEW=5

[GS_FORM_GROUP]
INPUT_FORM_PATH=wizard_test_input_form.asp
INPUT_FORM_MODE=search
```

| FIG. 21C-1 |
| FIG. 21C-2 |
| FIG. 21C-3 |

```
                   wizard_test (1).ini
RESULT_FORM_PATH=wizard_test_result_list.asp
RESULT_FORM_MODE=list
PLUGIN_VALUE=True
STRUCTURE_FIELDS=MolTable.Structure
FORM_GROUP_FLAG=GLOBAL_SEARCH
MW_FIELDS=MolTable.MolWeight
FORMULA_FIELDS=MolTable.Formula
SEARCHABLE_ADO_FIELDS=MolTable.Molname;0,Synonyms;0,Synonyms.SYN_ID;1,Synonyms.Sy
nonym;0
REQUIRED_FIELDS=NULL
SDFILE_FIELDS=NULL
TABLE_GROUP=base_table_group
NUM_LIST_VIEW=5
FIELD_MAP_GROUP=gs_field_map_group
```

FIG. 21C-1

```
[ADD_RECORD_FORM_GROUP]
INPUT_FORM_PATH=wizard_test_input_form.asp
INPUT_FORM_MODE=search
RESULT_FORM_PATH=wizard_test_result_list.asp
RESULT_FORM_MODE=list
PLUGIN_VALUE=True
STRUCTURE_FIELDS=MolTable.Structure
FORM_GROUP_FLAG=ADD_RECORD
MW_FIELDS=MolTable.MolWeight
FORMULA_FIELDS=MolTable.Formula
SEARCHABLE_ADO_FIELDS=MolTable.Molname;0,Synonyms.SYN_ID;1,Synonyms.Synonym;0
REQUIRED_FIELDS=NULL
SDFILE_FIELDS=NULL
TABLE_GROUP=base_table_group
NUM_LIST_VIEW=5
TABLE_ORDER_FULL_COMMIT=MolTable,Synonyms
TABLE_ORDER_PARTIAL_COMMIT=MolTable,Synonyms
REG_COMMIT_BASETABLE=MolTable
REG_COMMIT_MOLTABLE=MolTable
```

FIG. 21C-2

```
[DRILL_DOWN_FORM_GROUP]
INPUT_FORM_PATH=wizard_test_input_form.asp
INPUT_FORM_MODE=search
RESULT_FORM_PATH=wizard_test_result_list.asp
RESULT_FORM_MODE=list
PLUGIN_VALUE=True
STRUCTURE_FIELDS=MolTable.Structure
FORM_GROUP_FLAG=INDEX_SEARCH
MW_FIELDS=MolTable.MolWeight
FORMULA_FIELDS=MolTable.Formula
SEARCHABLE_ADO_FIELDS=MolTable.Molname;0,Synonyms.SYN_ID;1,Synonyms.Synonym;0
REQUIRED_FIELDS=NULL
SDFILE_FIELDS=NULL
TABLE_GROUP=base_table_group
```

FIG. 21C-3

```
wizard_test (1).ini

NUM_LIST_VIEW=5
INDEX_DB=wizard_test

[GS_FIELD_MAP_GROUP]
STRUC_FIELD_MAP=MolTable.Structure,MolTable.Structure
MW_FIELD_MAP=MolTable.MolWeight,MolTable.MolWeight
FORMULA_FIELD_MAP=MolTable.Formula,MolTable.Formula
OTHER_FIELD_MAP1=NULL
OTHER_FIELD_MAP2=NULL
OTHER_FIELD_MAP3=NULL
OTHER_FIELD_MAP4=NULL
OTHER_FIELD_MAP5=NULL
OTHER_FIELD_MAP6=NULL
```

FIG. 21D

DERIVING DATABASE INTERACTION SOFTWARE

BACKGROUND OF THE INVENTION

This application relates to deriving database interaction software.

A computer software application that is implemented for execution on one type of computer system may not execute at all, or only with significant difficulty, on another type of computer system. For example, applications that are implemented to display information on a computer monitor of a local personal computer or to acquire end-user input via the personal computer's local input device (e.g., keyboard) are typically ill-suited for displaying or acquiring such information in another way, such as via a wide area network or a World-Wide Web ("Web") browser. As a result, if a user relies on such an application to enter and retrieve data in a useful way, it is typically difficult or impossible for the user to allow another user at a remote location to enter and retrieve the data.

In some cases, it is possible to use computer software known as remote control software that allows a modem or network based data connection to be used to extend, in a functional way, the physical distance to the monitor or the input device to be used with the application. Application data directed to the local computer monitor is intercepted by the remote control software and is sent by the remote control software via the data connection to a remote monitor. Remote end-user input data is received by the remote control software via the data connection and is presented by the remote control software to the application as local end-user input data. The remote control software requires local and remote components that are implemented to allow remote access to the application. The local component executes at a local computer where the application executes, and the remote component executes at a remote computer that includes the remote monitor and that acquires the remote end-user data.

If the application includes a database application that provides an end-user with access to information in a database, the remote control software can provide remote access to the information in the database only when and if the local computer is operative and the application is executing. In addition, since each end-user requires a separate executing instance of the application and the local computer may have difficulty allowing more than a small number of instances to execute simultaneously, only a small number of end-users may be able to make effective use the application at the same time.

Use of the application via the remote control software is typically sluggish, due to the need for real-time conversion of application data to and from a format that is suitable for transmission over the modem or network based data connection. Such conversion is also prone to mistakes, especially if the application data directed to the local computer monitor includes complex graphical or transient data such as video data.

A new application that is implemented specifically for use from a remote location, such as a Web application, may be created to provide remote access to a database. Developing such a Web application can take significant time, particularly in a case in which details about the interior structure of the database and the data connection to the database are not readily available.

SUMMARY OF THE INVENTION

Methods and systems are provided for deriving database interaction software. Based on an analysis of computer software data for a desktop application that interacts with a database, a Web-based application is derived that interacts with the same database. User interface forms are derived for the Web-based application that provide at least some of the functionality of user interface forms used in the desktop application. Information gleaned from the analysis of the computer software data is used to provide a direct data connection between the Web-based application and the database.

Different aspects of the invention allow one or more of the following. A new Web-based counterpart of an existing desktop database application can be created with little input from an end-user. Information in an existing database that is accessible only via a local desktop application can be made accessible via any modern Web browser. An existing database that can receive end-user input via a desktop interface only, can be provided with user input received through a Web browser.

Other features and advantages will become apparent from the following description, including the drawings, and from the claims.

BRIEF DESCRIPTION OF THE DRAWINGS

FIGS. 5–18 are illustrations of output produced by software.

FIGS. 20, 21A–21D are illustrations of computer data.

DETAILED DESCRIPTION

Figure 1:
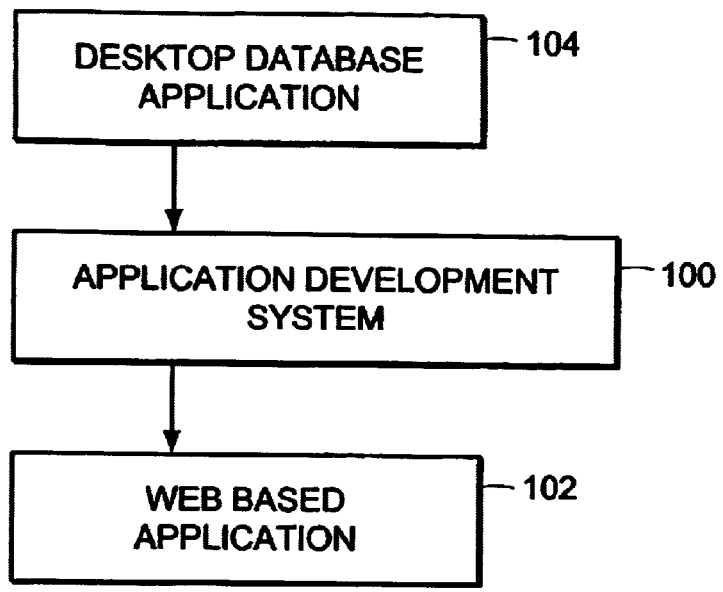
FIGS. 1–3 are block diagrams of computer-based systems.

FIG. 1 illustrates an application development system 100 by which a Web based application 102 is derived from a desktop database application 104.

Figure 2:
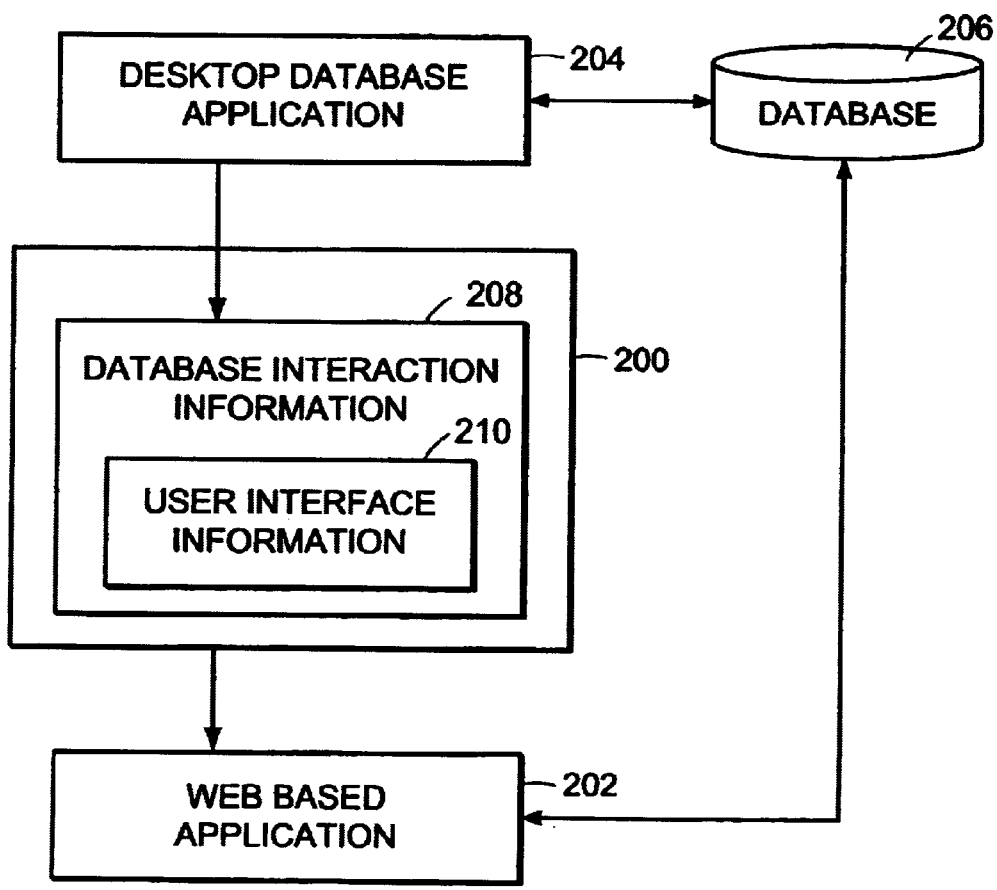

FIG. 2 illustrates a specific embodiment 200 in which a Web based application 202 derived from a desktop database application 204 is configured, in the derivation, to interact with a database 206 that is relied upon by the desktop database application. The configuration is based on database interaction information 208 that is acquired from the desktop database application and that may include an identification of pertinent records and fields in the database as well as information that is necessary to complete a data connection to the database. The Web based application may also be configured, based on user interface information 210 acquired from the desktop database application, to have many or all of the user interface characteristics of the desktop database application. For example, in a particular implementation, the desktop database application may have a feature in which an electronic form having a particular layout arrangement is presented to the end-user, the database interaction information includes a description of the particular layout arrangement (e.g., coordinates for windows or other elements of the form), and the Web based application may be configured to cause the end-user's Web browser to display a form having nearly or exactly the same particular layout arrangement.

Figure 3:
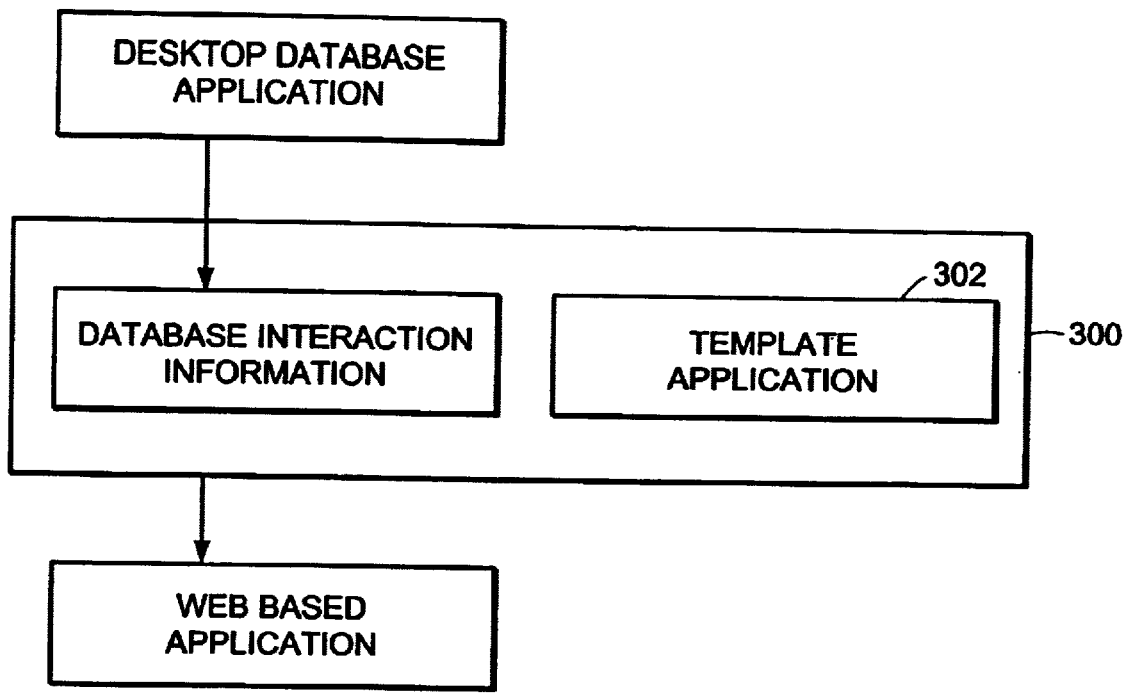

In a specific implementation 300 (FIG. 3), a template application 302 may be used in the derivation of the Web based application. The template application includes an incomplete Web based application that may be customized and supplemented, by reference to the database interaction information and the user interface information, to produce the Web based application. In at least some cases, it may be advantageous if the template application includes software capabilities sufficient to provide the Web based application with all, or nearly all, of the user interface capabilities of the desktop database application, and to allow the Web based application to interact with any, or nearly any, database with which the desktop database application may interact. The software capabilities may include capabilities to allow creation of Web based versions of a search form, a viewing form, and a data entry form, to allow the end-user to search the database, view the contents of the database, and alter the contents of the database, respectively. Information derived from the database interaction information, particularly information identifying records and fields, may be used to retrieve information from the database to populate the forms. In a specific embodiment, the template application includes a source code program from which a compiler program can create an executable program.

Figure 4:
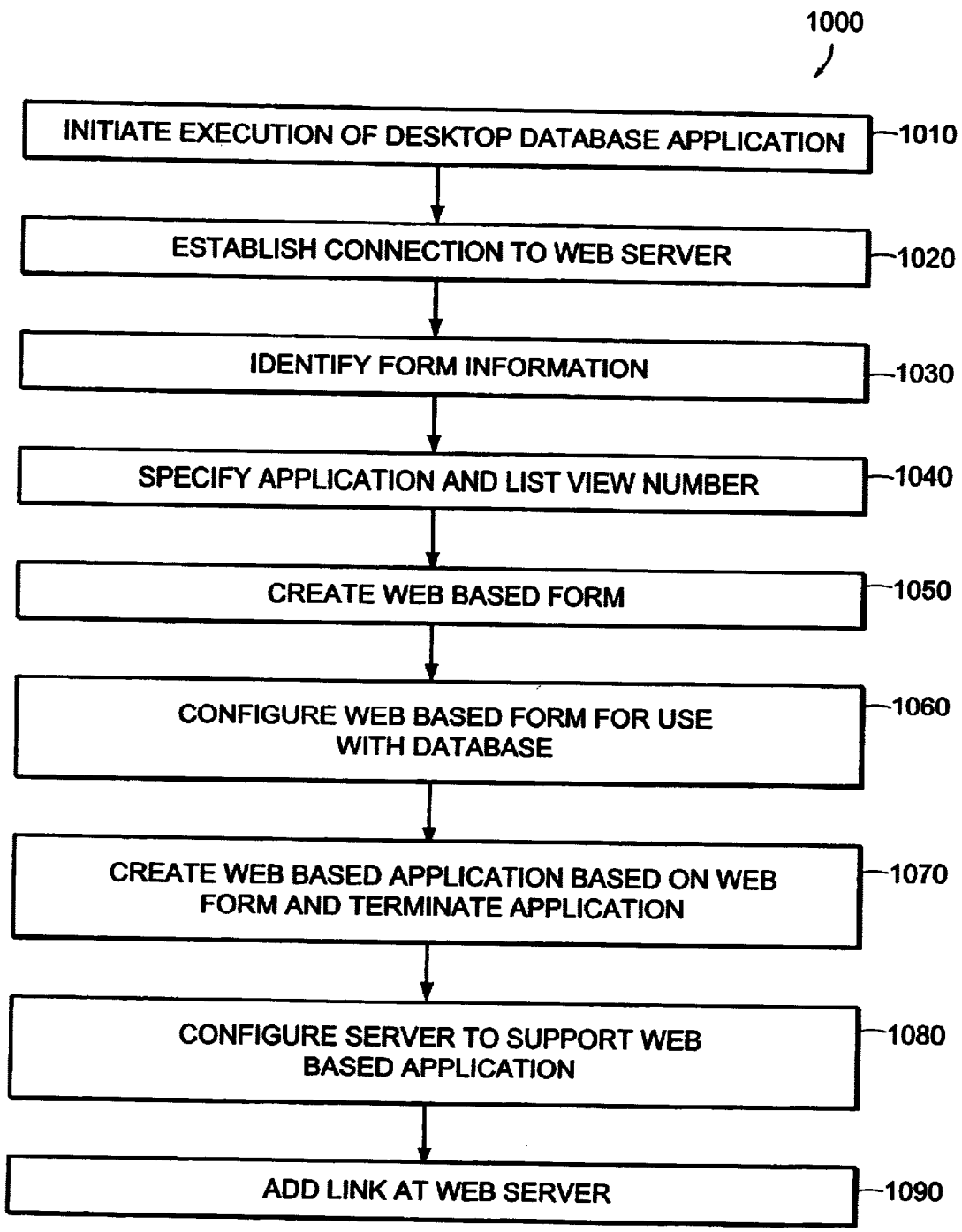
FIGS. 4 and 19 are flow diagrams of computer-based procedures.

A procedure 1000 (FIG. 4) may be used in the derivation of the Web based application. Execution of the desktop database application is initiated (step 1010). A connection is established to a Web server (having Web server software) where the Web based application is to execute (step 1020). Form information is identified for a form used in the desktop database application (step 1030). For example, the form information may be identified by prompting the end-user to specify a filename for a computer data file that describes the form.

An application name and a number are specified, e.g., by the end-user in response to one or more prompts (step 1040). The name identifies the Web based application that is to be created, and the number represents the number of records to be displayed by the Web based application in a list view of records of the database.

A Web based form is created (step 1050). Based on the form information, the Web based form is configured for use with the database (step 1060). For example, elements of the Web based form ("Web form elements") may be created that correspond to elements of the form used in the desktop database application ("desktop form elements"), and associations between the Web form elements and fields or records of the database may be created corresponding to associations, as indicated in the form information, between the desktop form elements and the fields or records. In another example, addressing information for the database may be derived from the form information.

The Web based application is created based on the Web form and the template application (step 1070). In a specific embodiment, the template application includes a source code program and the Web based application may be created by producing a copy of the source code program, producing a variable values file that fills in values for variables specified in the source code program (e.g., names of database fields or records), and compiling the source code program together with the variable values file to produce an executable program.

The Web server is configured to support the Web based application (step 1080). For example, switch settings at the Web server may be set to accommodate the Web based application, and the Web based application may be registered at the Web server as residing at a particular location such as in a particular subdirectory, and as needing to execute in a separate memory space, with a script timeout value (e.g., 900 milliseconds).

A link is added at the Web server to allow execution of the Web based application to be initiated by clicking a representation of the link on a Web page supplied by the Web server (step 1090).

The template application and the resulting Web based application may be implemented as Microsoft® Active Server Pages ("ASP") programs or as programs otherwise created using a combination of a page description language such as Hypertext Markup Language ("HTML") and a scripting language such as vbscript or javascript. The database may include, for example, a Microsoft® Access database, an Oracle® database, or a CambridgeSoft™ Chemfinder™ database.

In a specific implementation, the desktop application may assist by providing functions that extract the form information from a computer data file for the form, and then make the extracted form information available for the derivation of the Web based application. In another implementation, such assistance may be provided by software that is separate from the desktop application.

If the Web application is to provide views or other functions that are not provided by the desktop application or are not described in the form information, information about the views or functions may be acquired, e.g., by prompting an end-user.

In a specific example, a desktop application provides access to a reactions database that stores information about chemical reactions produced by a researcher. For example, if the researcher uses a particular reaction in two unrelated procedures, the reaction may be recorded in the reactions database in a reactions table and in a notebooks table. The reactions table includes a respective reaction record for each type of chemical reaction used by the researcher, and the notebooks table includes a respective notebook record for each project handled by the researcher. When a reaction record is selected, information for the corresponding type of chemical reaction is presented together with a list of notebooks for projects in which a chemical reaction of the corresponding type has been used. When a notebook record is selected, information for the corresponding project is presented together with a list of types of chemical reactions that have been used in the project.

In the case of the reactions database, after the Web application is derived from the desktop application, the Web application is able to directly manipulate and retrieve data from the reactions table and the notebooks table fully independently of the desktop application, such that such manipulation and retrieval can be carried out even if the desktop application is removed.

Figure 6:
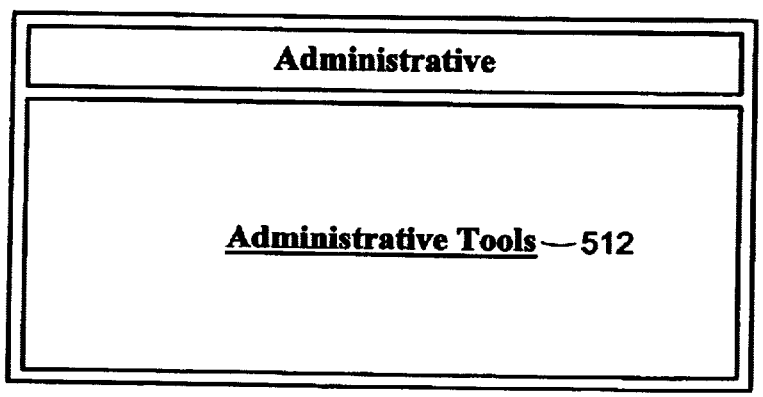
Figure 5:
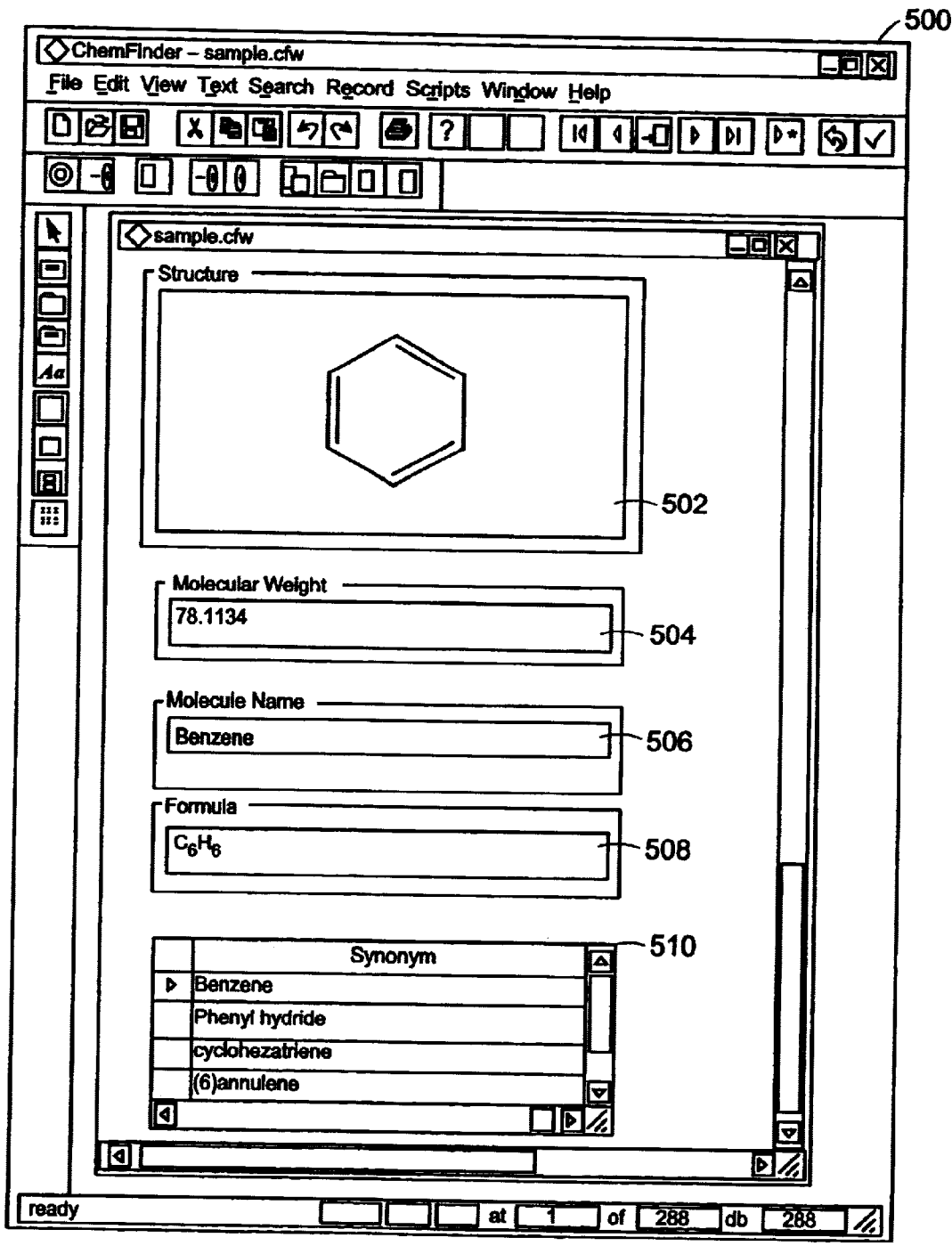
Figure 7:
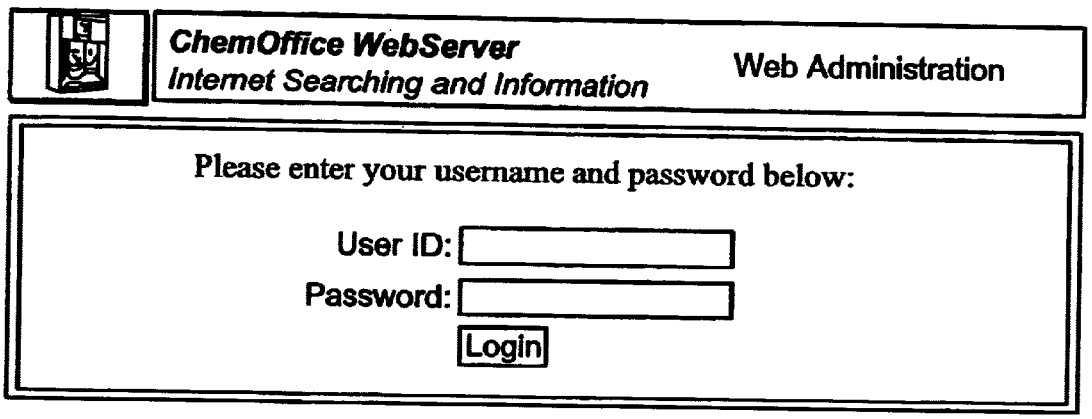
Figure 9:
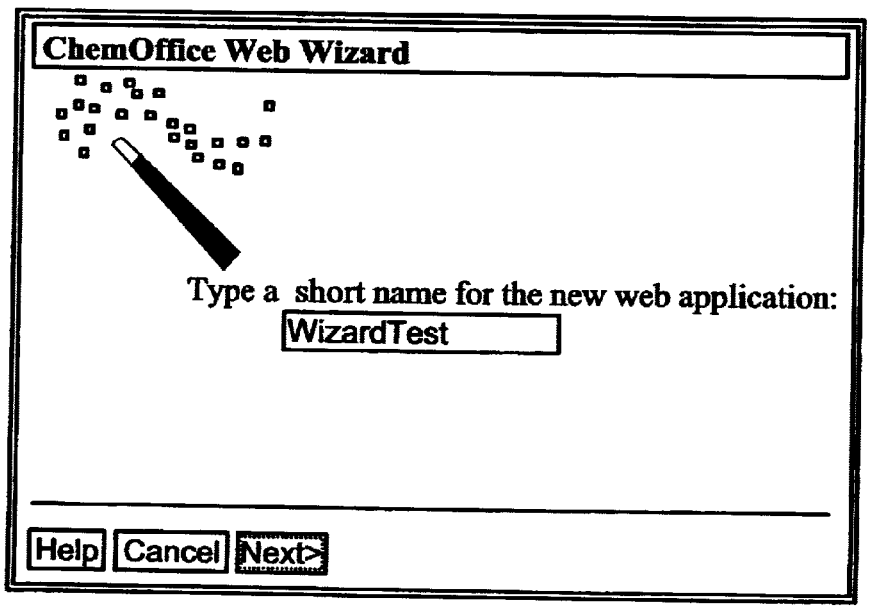
Figure 8:
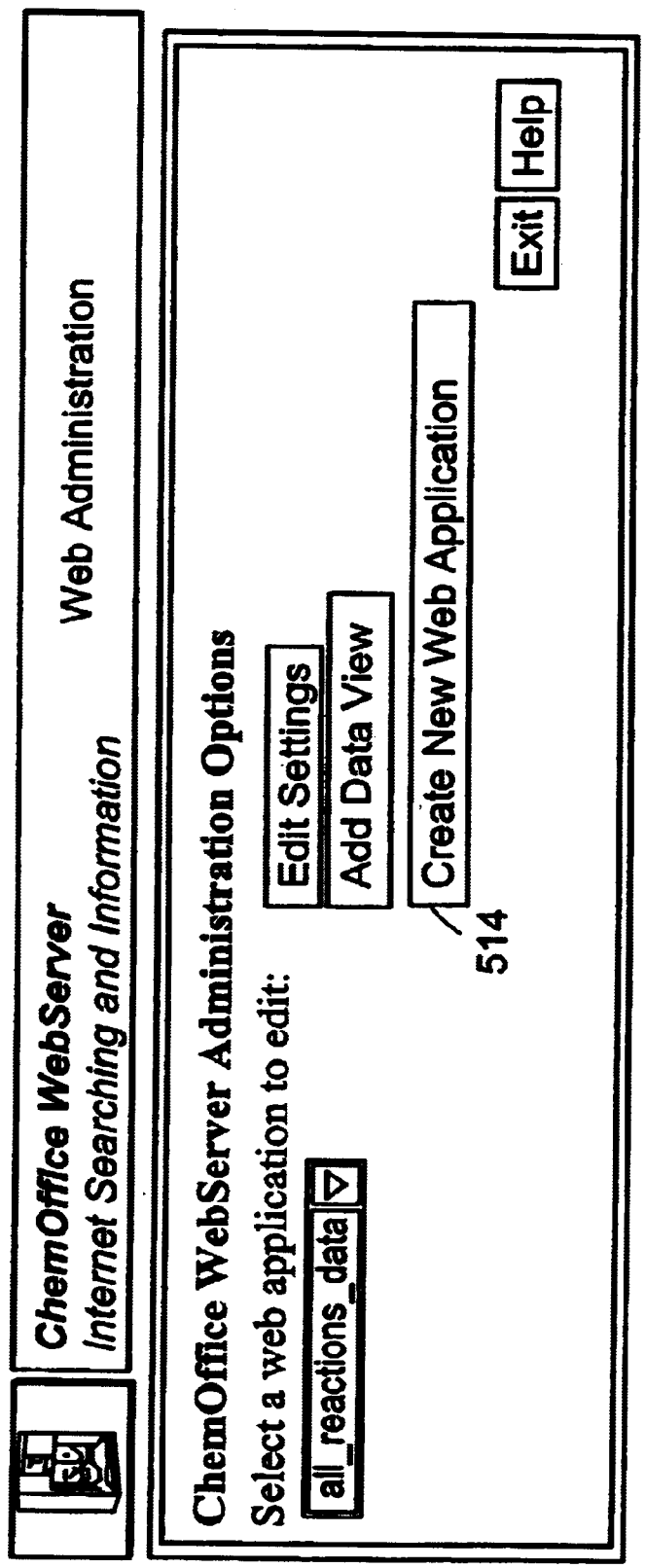
Figure 10:
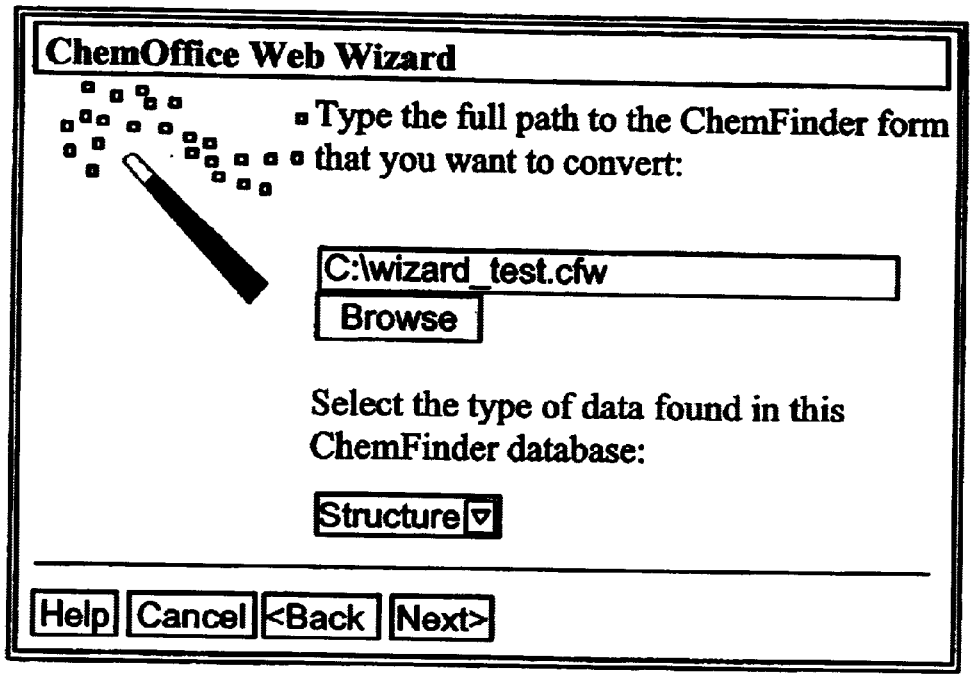
Figure 11:
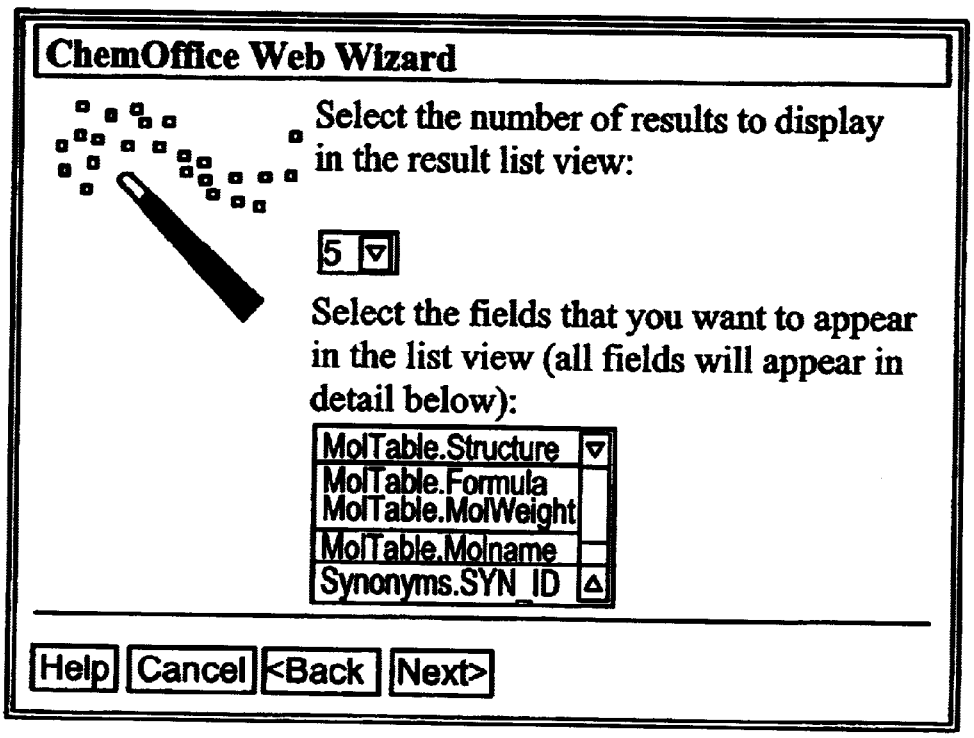
Figure 12:
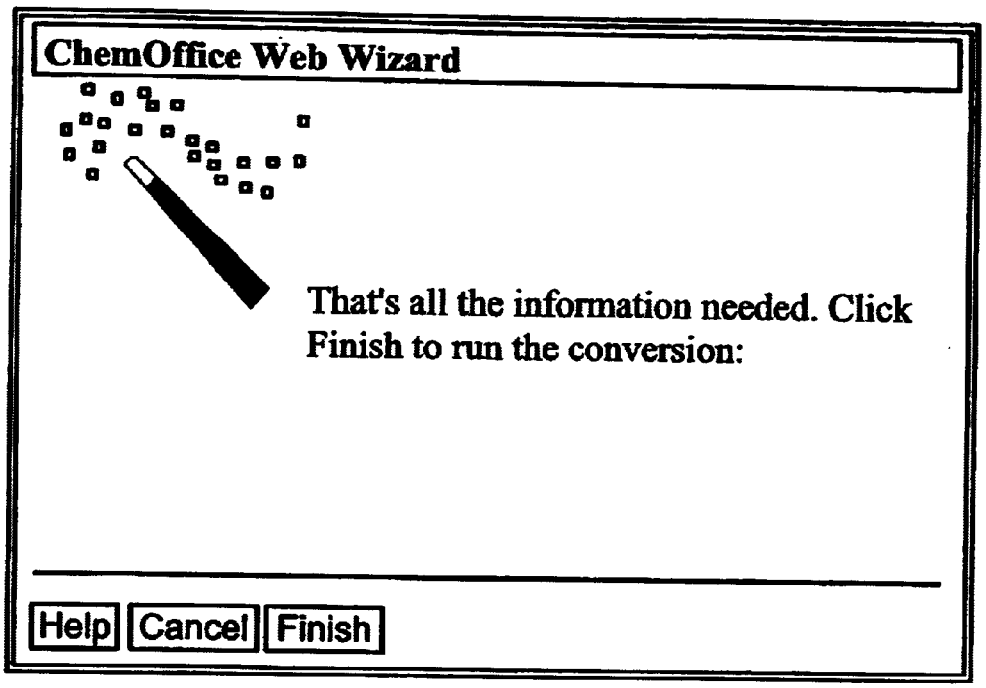
Figure 13:
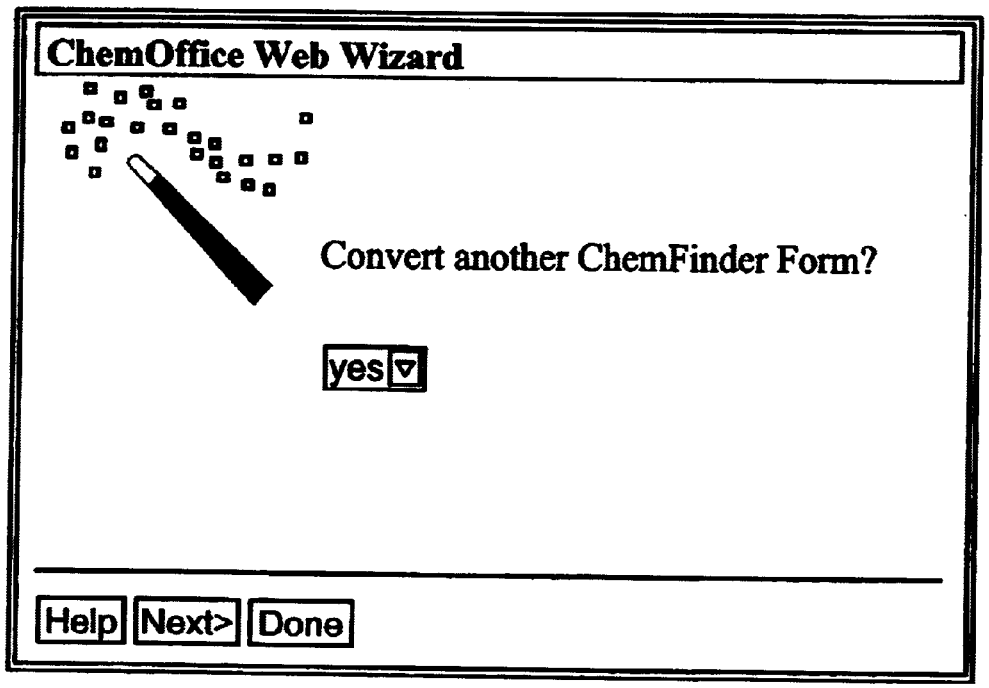
Figure 14:
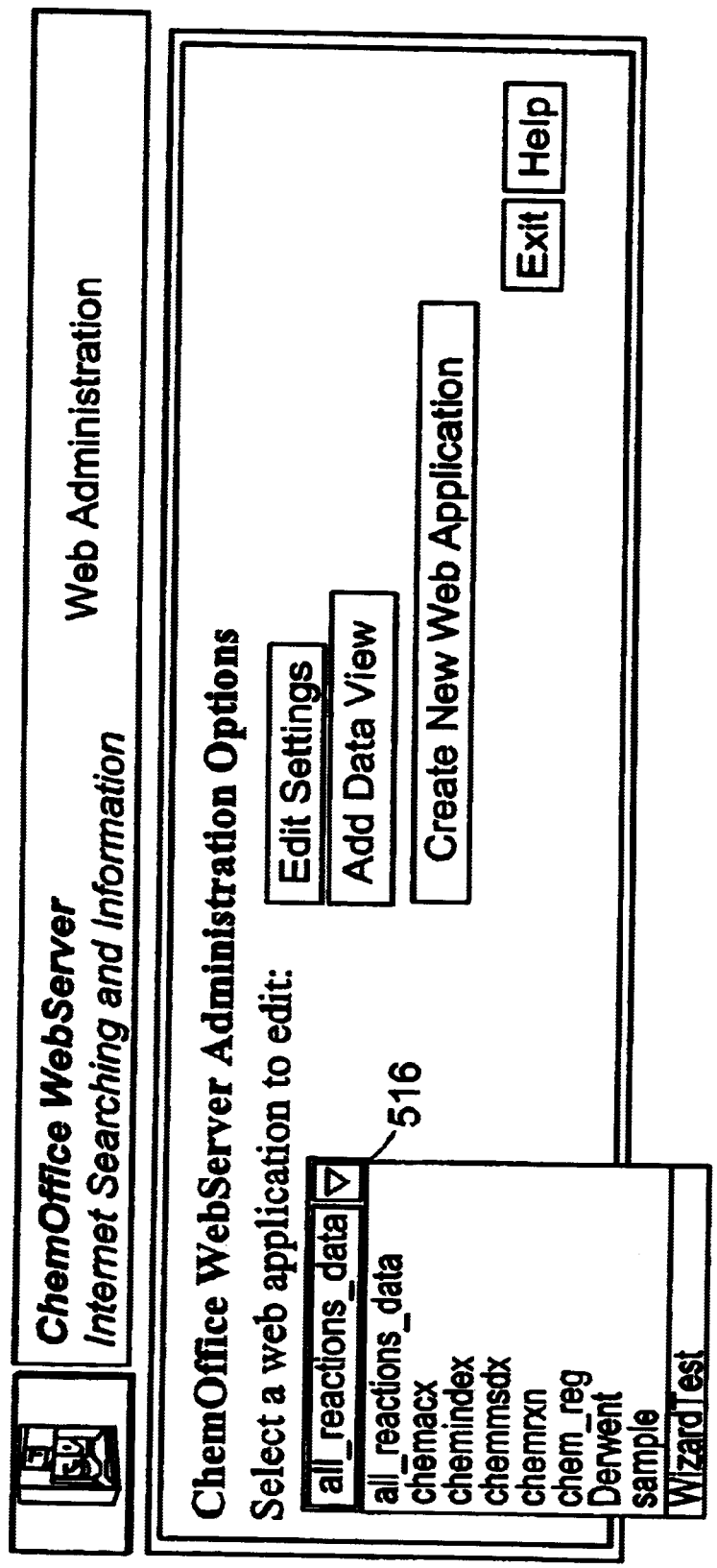
Figures 15, 16:
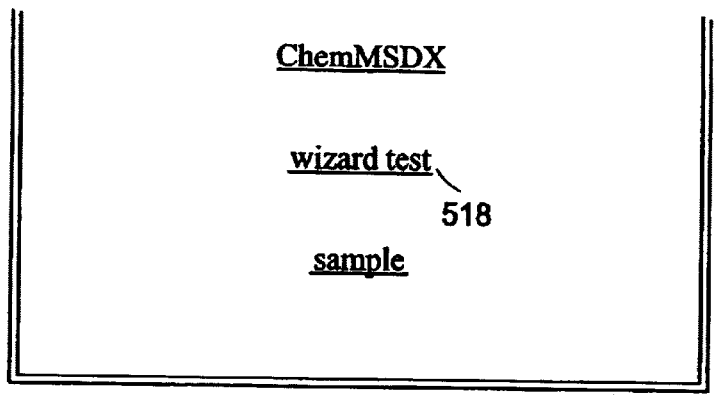
Figure 18:
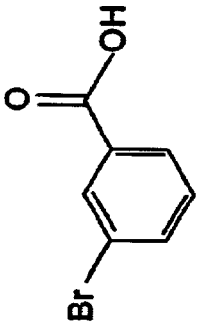
Figure 19:
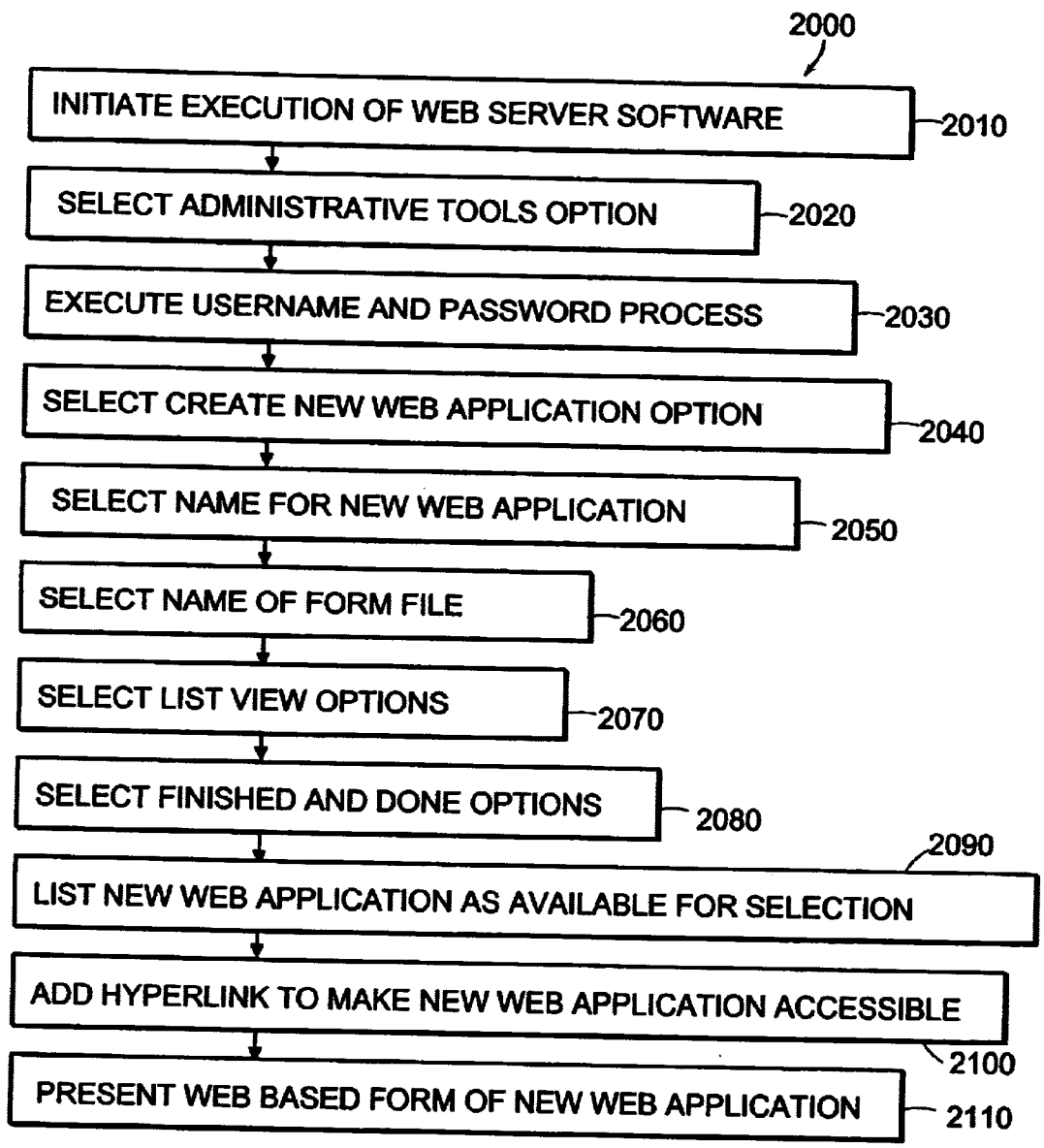
Figures 20, 20A:
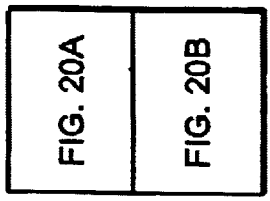
Figures 1, 21B:
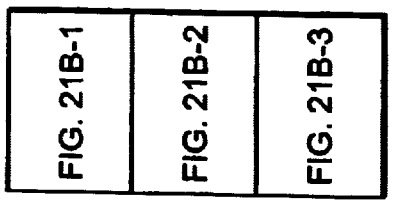

FIGS. 5–18 illustrate a specific example of a user interface that may be used to produce the Web based application ("new Web application"). A form file includes a description of desktop database form 500 (FIG. 5) which has a structure window 502, a molecular weight window 504, a molecule name window 506, a formula window 508, and a synonym window 510. With reference to procedure 2000 (FIG. 19), execution of Web server software (here, "ChemOffice WebServer") is initiated (step 2010) and an administrative tools option 512 (FIG. 6) is selected (step 2020). To help block unauthorized access to the option, a username and password process (FIG. 7) is executed (step 2030). A create new Web application option 514 (FIG. 8) is selected (step 2040). A name (FIG. 9) is selected for the new Web application to be created (step 2050). The file name (FIG. 10) of the form file is selected (step 2060). List view options (FIG. 11) are selected (step 2070) and finish and done options (FIGS. 12–13) are selected (step 2080). The new Web application is listed in a dropdown list 516 (FIG. 14) as a Web application that is available for selection (step 2090) and a hyperlink 518 (FIG. 15) is added to make the new Web application accessible (step 2100). A Web based form 520 (FIG. 16) of the new Web application is presented (step 2110). Web based form 520 has a structure window 522, a molecular weight window 524, a molecule name window 526, a formula window 528, and a synonym window 530 that correspond to structure window 502, molecular weight window 504, molecule name window 506, formula window 508, and synonym window 510, respectively, of the desktop database form. As shown in examples in FIGS. 17–18, the new Web application can provide a results list view 532 and a results form view 534.

In a specific embodiment, each Web form serves as an entry point to the new Web application, and includes references to functions or subroutines of the Web server software to retrieve information from, and otherwise manipulate, the database. When execution of the new Web application is initiated, e.g., by selection of one of the Web forms, the Web server software retrieves information from one or more ini files to use in performing searching or displaying of database data by one or more of the Web forms. In the case of a chemical database such as a reactions database, ActiveX™ Data Objects ("ADO") and Chemfinder may be used to gain access to database fields that do not describe chemical structures and database fields that do describe chemical structures, respectively.

In the following example, automated development software known as a Web Wizard works with Chemfinder desktop database software and a Chemfinder desktop database form file.

The Chemfinder form file identifies windows ("boxes") as being either connected to a base table of the database, or connected to another table of the same or a different database ("subtable"). In the case of a subtable, the box could be connected to same datasource as the base table, or to another datasource. In either case, the subtable is related to the basetable by a primary key to foreign key relationship that is typical of relational data structures.

In an example Chemfinder form file, the base table is named "MolTable" and is connected to a datasource "Wizard_test.mdb", and there is a single subtable named "Synonyms" that is related to MolTable by a link from the Synonyms table's "SYN_ID" field to the MolTable's "MOL_ID" field in a one to many relationship. Fields in the base table include Structure, Molecular Weight, Formula and Mol_Name. Fields in the Synonyms subtable include SYN_ID and Synonym.

The Chemfinder form that is presented to the end-user has 5 fields displayed in boxes of various dimensions.

The following description concerns a request from the Web Wizard.

1. In a request to Chemfinder to produce, from the form ("cfw") file, an output file in ASCII text format, the name of the cfw file, "Wizard_Test.cfw", and the name to be given to the output file, "cfwoutput.txt", are provided. The following conversion procedure is executed. In particular, when the Web Wizard requests the ASCII text file, the Web Wizard sends the name of the Chemfinder form file ("wizard_test.cfw") and the name to be given to the output file in which to put the ASCII output ("cfwoutput.txt").

2. Chemfinder opens Chemfinder form file and extracts properties of loaded form objects and outputs as text. In particular, Chemfinder loads the cfw form file ("wizard_test.cfw") and internally converts the form into a single CForm Object that has several CformBox objects, i.e., a unique CformBox object for each visible box on the form. In a special case in which the CformBox represents a link to a subtable, a CSubFormBox is created which in a recursive manner contains CformBox objects representing the constituent visible boxes.

The CForm object's datasource is the base table to which the all other information in the form relates.

2a. For production of the ASCII output, the properties of each of the objects are extracted in the following order represented in pseudocode:
   1. CForm
      1a . . . 1x CformBox,
         2a if CformBox is CSubFormBox then output CsubFormBox.
         3a . . . 3x CformBox (for CSubFormBox).

2b. In the case of the base table "MolTable" and converting the "Molecule Name" box on the form to ASCII output, the pseudocode may appear as follows:
   a. Call CForm::WriteAscii("Wizard_Test.cfw" "cfwoutput.txt")
   b. Write standard Header information that describes the ASCII representation of parameters
   c. Get object property ("dsrc") of CForm that contains all database connection information
   d. From dsrc, get datasource file path from a property of dsrc object/ / "C:\wizard_test\Wizard_test.mdb"
   e. From dsrc, get the table name to which the CForm is attached //"MolTable"
   f. Write ASCII output that describes d. & e.
      DSRC "WC:\wizard_test\Wizard_test.mdb" "MolTable"
   g. Look into the fontMgrObj and write out all the fonts, styles and sizes used for describing box objects.
      FONT 80000 MS Sans Serif
      FONT 100000 Arial
      FONT 8700000 Arial
   h. For each CformBox in CForm, call CformBox::WriteAscii("Wizard_Test.cfw" "cfwoutput.txt"). In particular, first determine whether CformBox has database information. If it does, retrieve fieldname and datatype information from the underlying database file. If the CformBox specifies a subform, the information for the field includes the primary key in the base table that links to the subtable, the datasource for the subtable, the subtable name, and the foreign key for the subtable. For a CformBox for a simple field, for example "MolName", the database information that is extracted includes the name of the column in the underlying mdb file, which is "MolName", and the datatype for the column, which is 0 (for text). A CformBox that has no database information is for either static text or a frame.

All the above information above is stored in a variable text which is output last in the ASCII output for the CformBox. In particular, the remaining properties of the CformBox are acquired, and include, in an Internal control type specification:

The left, top, right and bottom coordinates of the box on the form.

The internal ID used by Chemfinder to distinguish the field.

The datatype from the underlying datasource (0 if the internal control type is static text or a frame).

The font type for the form box. This references the font information output earlier in the ASCII output.

The text created as described above.

The example includes the following ASCII output:
   FBOX 0, 28, 293, 301, 3172007000 "MolName"

k. Each CformBox is processed similarly. In a case in which CformBox is CSubFormBox, a recursion occurs in which the CSubFormBox is treated as CForm so that its information can be produced in ASCII output. To indicate that a subform description is starting, e.g., for the SYNONYM Table, the following ASCII output may be produced:

FBOX 6, 23, 411,306, 542, 2001001 MOL_ID, "C:\wizard_test\wizard_test.MDB", Synonyms, SYN_ID, Synonym.
SUBFORM 2001
. . .
DSRC "C:\wizard_test\wizard_test.mdb" Synonyms
FBOXS for synonyms subform . . .
END SUBFORM The text in FBOX 6 starting at MOL_ID is the database information for linking from the base table to the sub table, and includes:

MOL_ID: the primary key in the basetable to which the subform is linked.

"C:\wizard_test\wizard_test.MDB": the file path to the datasource (since the path may differ from the path for the base table).

Synonyms: the name of the subtable.

Syn_ID: the field in the subtable to which the primary key in the base table is linked.

Synonym: The fields in the subtable.

The process continues until ASCII output is produced for all CformBoxes and CSubFormBoxes of CForm.

Software routines used to extract the property information for each of the objects CForm, CformBox, CsubFormBox are included below.

```
/                                                                  /
------------------------------------------------------------------
bool CForm::WriteAscii(CStdioFile *f)
{
BeginWaitCursoro( );
f→WriteString("* CFW Form Definition\n\n");
// f→WriteString("* DSRC:");
// f→WriteString(CDataSource::GetFileHeaderString( ) + "\n");
f→WriteString("* FONT:");
f→WriteString(CjFont::GetFileHeaderString( ) + "\n");
f→WriteString("* FBOX:");
f→WriteString(CformBox::GetFileHeaderString( ) + "\n");
f→WriteString("\n");
// data source must come first
if (GetRset( )→GetDataSource( )) {
CDataSource *dsrc=GetDataSource( );
CString db=dsrc→GetFileName( ), table= dsrc→GetTableName( );
if (db.IsEmpty( )) { // this means there is no file name
    db=dsrc→GetDataSourceName( );
}
f→WriteString("DSRC \"")
f→WriteString(db);
f→WriteString("\"");
f→WriteString(table);
// GetRset( )→GetDataSource( )→WriteAscii(f);
f→WriteString ("\n");
}
// then fonts
gFontMgr.WriteAltFontsAscii(f);
f→WriteString("\n");
// then form boxes
LOOP_BOXES {
f→WriteString("FBOX");
box→WriteAscii(f);
f→WriteString("\n");
}
EndWaitCursor( );
return true;
}file:/ /---------------------------------------------------- ----
void CformBox::WriteAscii(CStdioFile *f)
char buf[255];
CString text;
int fldType;
if (HasDBData( ) && m_field !=NULL) {
    ASSERT(m_field→GetColumnName( )==m_fieldName);
    text=m_field→GetColumnName( );
    fldType=m_field→GetType( );
}else {
    text=m_staticText;
    fldType=0;
}
int tmpFontNo=gFontMgr.GetFont(m_fontNo)→GetTmpNo( );
sprintf(buf, "%d %d %d %d %d %d %d %d %d \"%s\"",
    m_ctlType, m_rect.left, m_rect.top, m_rect.right,
    m_rect.bottom,
    m_ID, m_dtype, tmpFontNo, fldType, text);
f→WriteString(buf);
}
/                                                                  /
------------------------------------------------------------------
void CSubformBox::WriteAscii(CStdioFile *f)
{
char buf[1024];
CString text;
int fldType;
CSubform *form=GetSubform( );
int tmpFontNo=gFontMgr.GetFont(m_fontNo)→GetTmpNo( );
if (HasDBData( ) && m_field !=NULL) {
ASSERT(m_field→GetColumnName( )==m_fieldName);
text=m_field→GetColumnName( );
fldType=m_field→GetType( );
CDataSource *dsrc=GetSubform( )→GetDataSource( );
CString db=dsrc→GetFileName( ), table= dsrc→GetTableName( );
CString linkTo=GetLinkToName( );
if (db.IsEmpty( )) { // this means there is no file name
    db=dsrc→GetDataSourceName( );
}
sprintf(buf, "%d %d %d %d %d %d %d %d %d \"%s\"\"%s\"\"%s\"",
    m_ctlType, m_rect.left, m_rect.top, m_rect.right,
    m_rect.bottom,
    m_ID, m_dtype, tmpFontNo, fldType, text, db, table);
```

```
// check for a linking field, and write that out if it exists
if (linkTo.GetLength( )) {
  strcat(buf, "\"");
  strcat(buf, linkTo);
  strcat(buf, "\"");
}else {
  strcat(buf, "\"\"");
}
CformBox *box;
bool bQuoted=false;
for(int i=0; i<form→NBoxes( ) && (box=form→GetBox
    (i)); ++i) {
  CField *fld=box→GetField( );
  if (!fld) continue;
  CString name=fld→GetColumnName( );
  // exclude non-relational and binary fields, plus the
    linking field
  if (fld→GetType( ) !=kfMol &&
      fld→GetType( ) !=kfMolwt &&
      fld→GetType( ) !=kfFormula &&
      fld→GetType( ) !=kfPict &&
      fld→GetType( ) !=kfBinary &&
      name !=linkTo) {
    // The first time through, bound it in quotes
    if (!bQuoted) {
      strcat(buf, "\"");
      bQuoted=true;
    } else
      strcat(buf, ",");
    strcat(buf, name);
  }
}
// If it was quoted (meaning there was something to
    write), write
ending quotes
  if (bQuoted)
    strcat(buf, "\"");
    strcat(buf, "\n");
  } else {
    text=m_staticText;
    fldType=0;
    sprintf(buf, "%d %d %d %d %d %d %d %d %d
      \"%s\"\n",
      m_ctlType, m_rect.left, m_rect.top, m_rect.right,
        m_rect.bottom,
      m_ID, m_dtype, tmpFontNo, fldType, text);
  }
  f→WriteString(buf);
  // Write the subform header
  CString sboxhdr;
  sboxhdr.Format("SUBFORM %d\n", GetID( );
  f→WriteString(sboxhdr);
  // Now write the contents of the subform
  form→WriteAscii(f);
  // Terminate the subform
  f→WriteString("END SUBFORM");
/
/---------------------------------------------------------------
void CFontMgr::WriteAllFontsAscii(CStdioFile *f)
{
  ClearTmpNos( );
  LOOP_FONTS {
    f→WriteString("FONT");
    font→SetTmpNo(i);
    font→WriteAscii(f);
    f→WriteString("\n");
```
```
  }
}
/
/---------------------------------------------------------------
void CJFont::WriteAscii(CStdioFile *f) char buf[255];
{
  BYTE r=GetRValue(m_color);
  BYTE g=GetGValue(m_color);
  BYTE b=GetBValue(m_color);
  // Write out the font, converting pixels to points
  int vat;
  CWindowDC dc(AfxGetMainWnd( ));
  val=-MulDiv(m_height, 72, dc.GetDeviceCaps
    (LOGPIXELSY));
  sprintf(buf, "%d %d %d %d %d %s", val, m_style,
    r, g, b, m_name);
  f→WriteString(buf);
}
************************************************************
```

Web Wizard opens the ASCII output file ("cfwoutputfile") and parses text information about tables, fields, subtable, data sources and display attributes by making several iterations of extracting information about tables, associated fields, data sources, and display appearance. In particular, the following steps are executed.

a. The Web Wizard stores the name of the associated Chemfinder form. This represents the form that is used if structural searching is performed in the resulting Web application. In such a case, Chemfinder serves as an OLE server to the ChemOffice WebServer, and performs only the structure, molecular weight, and formula searches.

The following is stored by the Web Wizard:

base_cfw_form=C:\wizard_test\wizard_test.cfw
form_name =wizard_test b. The Web Wizard analyzes the first DSRC in the ASCII output to determine the base table and base table datasource:

DSRC "C:\wizard_test\wizard_test.mdb", "MolTable"

The following information is derived and stored and represents all or substantially all of the connection information necessary for performing a search involving any of the fields in the base table "MolTable":

base table=MolTable
base connection datasource="C:\wizard_test\wizard_test.mdb"
connection_type=DBQ (derived from the fact that the datasource is described by a full path rather the n a DSN name)
driver_type=DRIVER={Microsoft Access Driver (*.mdb)};DriverID=25; FIL=MS Access (derived from the fact that the datasource is described by a full path rather then a DSN name and the file type is *.mdb)

In addition, some standard values are set that can be changed at a later time by the ChemOffice WebServer administrator and include:

Connection_Timeout=30
Command_Timeout=30
Connection_UserName=""
Connection_Password=""

A section of the ini file is thereby formed. In the sections entered in the ini file for each of the tables, an entry "ADO_CONNECTION" is provided where the connection information that should be used when the table is part of an SQL statement is obtained.

[BASE_CONNECTION]
CONN_TYPE=DBQ

CONNECTION_STRING=C:\Wizard_test-wizard_test.MDB;Driver={Microsoft Access Driver (*.mdb)};DriverID=25;FIL=MS Access;
CONNECTION_TIMEOUT=30
COMMAND_TIMEOUT=30
CONNECTION_USERNAME=""
CONNECTION_PASSWORD=""

Connection information for the converted Chemfinder form also forms a section. In the sections entered in the ini file for each of the tables, an entry "CHEM_CONNECTION" is provided where the connection information that should be used to connect to a Chemfinder form for structure searching is obtained. Only tables having at least one structure, molecular weight, or formula entry in the original ASCII output file have a value for this entry.

[BASE_CFW_FORM]
STRUC_ENG=CFW (entered by flexibility for use with other structure engines then Chemfinder).
STRUC_FORM_NAME=WizardTest
STRUC_DB_PATH==C:\Wizard_test-wizard_test.MDB
STRUC_TABLE_NAME=Wizard c. With respect to parsing each FBOX description, there are two separate sets of information stored: one set is stored for use for outputting information in the ini file in each and the other is used for outputting HTML equivalents to the FBOX descriptions in the input and results .asp forms.

The following is an example of an FBOX entry in the ASCII output file:

FBOX 0, 28, 293, 301, 3172007000 "MolName"

According to the example, the following information is stored directly or is derived from the information provided in the FBOX entry:

box type=FBOX 0
box_left=28
box_right=301
box_top=293
box_bottom–317
box_width=273/10 (derived from 301–28 divided by 10 to convert to a reasonable Web representation)
box_height=24/10 (derived from 317–293 divided by 10 to convert to a reasonable Web representation)
id=2007
datatype 0
font number=0
datatype=0

The derived values have the following characteristics:

box type: For the final output into HTML, each FBOX entry from the ASCII output file is converted into an HTML output string that is used by ChemOffice WebServer. In the InputForm these are of type "ShowinputField . . . ". In the results forms these are of the form "ShowResultField". In the case of FBOX 6 this becomes, in the input form, one ShowinputField entry for each of the fields in the table and for the results, "ShowResultsTable . . . " as a subtable lookup is performed.

box coordinates (raw): The raw coordinates are used to define the final output order of each of the HTML elements in the .asp files.

box coordinates (width and height derived): The derived coordinates are used to size the HTML elements in the resulting HTML form.

id: A unique id is used internally by Web server to keep track of information when duplicate names are encountered.

datatype: The datatype value is not used.

font number: Font information is used for creating HTML output that is as close to original desktop form as practicable. (Font mapping information is found for each table description in the FONT tags, and is stored in a array for reference by Web Wizard when the final HTML forms are being generated.)

datatype: If the boxtype is 0, the datatype represents the field's data type in the datasource. If the boxtype is 6, the boxtype indicates the datatype of the primary key linking field to the subtable.

The following steps apply to storing table and field information.

a. For FBOX 0 and FBOX 8, each field name for the current table and its datatype are stored for the corresponding table Section in the ini file.

b. In the case of FBOX 6, which indicates a subtable, information about the subtable, its relationship to the base table, the subtable's fields and its datasource are stored for creating a new table section in the ini file.

c. For the FBOX 0 example below, the FieldName= "MolName" and Datatype =0" would be used by the Web Wizard and added to the table information for "MolTable".

The following steps apply to storing HTML information.

Information for HTML output is derived from the FBOX descriptions in the following manner, with reference to the FBOX O example below.

FBOX 0, 28, 293, 301, 3172007000 "MolName"

d. Once the entire ASCII output file has been processed, the Web Wizard has stored and derived all the information about the tables, subtables, and links for accessing the databases. This information is then stored in the format of the ChemOffice WebServer ini file. In addition, by this point the Web Wizard has created a corresponding Web version of the FBOX entries that call the ChemOffice WebServer source to invoke searching and displaying of results.

For example, the example FBOX entry above for MolName in the Chemfinder ASCII output becomes the following in the Input form of the Web version:

ShowInputField dbkey, formgroup, "MolTable.MolName", 0, "30"

The "dbkey" portion is the name of the data view, which is equivalent to the Chemfinder form name with .cfw extension removed. The "formgroup" portion is a ini designation that directs ChemOffice WebServer to use particular forms for input and output. The "MolTable.MolName" portion is the Table and Fieldname which are derived from the field name of the FBOX entry and the current table being parsed. The "0" portion represents the datatype of the field and is used for type checking on the client side of a client/server transaction fore a submission is accepted. The "30" portion is the width of the entry box displayed in the end-user's Web browser, and is derived from the difference between the left and right coordinates, which is divided by 10 and rounded.

The following appears in the results for a similar but different entry for the same FBOX:

ShowResult dbkey, formgroup, BaseRS "MolTable.MolName, "raw", 0, 0

BaseRS is the recordset that ChemOffice WebServer generates from running the input criteria from the Input form.

The "raw" portion indicates that the results should be in raw HTML format, not displayed in a text box or other HTML form element.

The "O,O" portion represents the width and height, respectively, that would be used to limit the width and height of display elements if something other than "raw" were used, such as textbox or text area. The Web Wizard uses "raw" as the default in each display instance.

4. Web Wizard creates a directory within the application's virtual directory (which is also created if this is a new application). Web Wizard also creates an ini file within the corresponding config folder. The ini file holds all of the information that ChemOffice WebServer requires to learn about the tables and fields in the data view and how to connect to them via ADO.

5. The table information stored by Web Wizard (example below) is stored as a section for each table in the original ASCII file. This corresponds to one section for each DSRC entry.

[MOLTABLE]
TABLE_NAME=MolTable
RELATIONAL_FIELDS=Molname;0
PRIMARY_KEY=MOL_ID
SQL_SYNTAX=ACCESS
SELECT_KEYWORD=DISTINCT
SELECT_ADDITIONAL=NULL
SELECT_JOIN=MolTable.Mol_ID
SELECT_LINKS=MolTable.MOL_ID;1, MolTable.MOL_ID;1
INTER_TABLES=NULL
ADO_CONNECTION=base_connection
CHEM_CONNECTION=base_cfw_form
STRUC_FIELD_ID=MOL_ID The following information relates to the derivation of each of the items in the Table Section of the ini file for the base table.

1. TABLE_NAME represents the actual name of the table in the data source. In an instance in which Chemfinder has more then one table specification with the same table name, with different relational links to the datasource, an alias is used for specifying this information in the ini file. The TABLE_NAME entry is used when ChemOffice WebServer forms the final SQL statement that generates the record set.

2. RELATIONAL_FIELDS includes all of the Field-Names and datatypes (fieldname;datatype) for each of the FBOX 0, or FBOX 8 entries for a particular table. In the case of FBOX 0 where the data type is 4 to indicate MolWeight (molecular weight), the field is not entered here, as it is searched via Chemfinder.

3. PRIMARY_KEY: The primary key for the base table is always MOL_ID since this form is converted from Chemfinder. In the case of a subtable, the Primary key is found in the FBOX 6 entry.

4. SQL_SYNTAX is derived from the datasource file path to be either ACCESS, ORACLE, or SQLSERVER.

5. SELECT_KEYWORD: If the instant table is the base table, the Web Wizard makes this entry DISTINCT by default.

6. SELECT_ADDITIONAL is left by the Web Wizard as a NULL. This is particularly useful if the end-user wants to customize the SQL by adding criteria.

7. SELECT_JOIN is not used for base table, even though there is an entry, as described below in connection with the "Synonyms".

8. SELECT_LINKS is not used for base table, even though there is an entry, as described below in connection with the "Synonyms".

9. INTER_TABLES indicates whether other tables need to be added to the SQL statement, and for the base table is set to NULL.

10. ADO_CONNECTION identifies connection information to use, and for the base, is set to "base connection".

11. CHEM_CONNECTION identifies the Chemfinder connection to use for searching chemical data, and for the base table it is set to "base_cfw_form".

12. STRUC_FIELD_ID identifies, if there is a CHEM_CONNECTION entry, the field that is to be used to send to Chemfinder for retrieving chemical information.

For a subtable, such as Synonyms, additional information in the FBOX 6 entry allows for entry of SELECT_JOIN, SELECT_LINKS, and INTER_TABLES. This information is used to create INNER_JOIN statements by the ChemOffice WebServer for search over subtables. The Synonyms table FBOX entries do not include structure, formula, or molecular weight entries or MW, so the chemical connection is not necessary. Also, the FBOX 6 database path is the same as the base table path so the same "base_connection" connection information is used if a lookup is performed.

[SYNONYMS]
TABLE_NAME=Synonyms
RELATIONAL_FIELDS=SYN_ID;1,Synonym;0
PRIMARY_KEY=SYN_ID
SQL_SYNTAX=ACCESS
SELECT_KEYWORD=NULL
SELECT_ADDITIONAL=NULL
SELECT_JOIN=Synonyms.SYN_ID=MolTable.MOL_ID
SELECT_LINKS=Synonyms.SYN_ID;1, MolTable.MOL_ID;1
INTER_TABLES=MolTable
ADO_CONNECTION=base_connection
CHEM_CONNECTION=NULL
STRUC_FIELD_ID=NULL Final output and searching are now described.

The complete ini file output corresponds to the needs of the ChemOffice WebServer. Each entry in the ini file is loaded into the Web application's memory. For example, Application ("base_connectionWizard_test") represents an array of base_connection information stored for a Wizard-Test dataview. Each item can be obtained by using pre-defined constants to access the information. For instance, when a connection string is needed for the base_connection information of WizardTest, an array is set equal to the application object, and a constant kConnString is used to retrieve the connection string from the array.

conn_info_array=Application("base_connectionWizard_test")

connection_string=conn_info array (kConnString)

The Web forms created by the Web Wizard are the entry points into the searching capabilities of the ChemOffice WebServer.

In the Input form thus created, a user may enter "benz" into the Molecule Name field of the Web form. The ChemOffice WebServer can then create an appropriate SQL statement as well as connect to the datasource to retrieve the corresponding records. For example, DataView may have MolTable as the base table specified in the ini file. A Criteria MolTable.MolName Like "benz%" string is generated as the Where clause for the search. ChemOffice WebServer forms the select statement based on the tables in the Criteria statement. Since MolTable is the only table, information in the MolTable entry only is required to form the statement. Since ChemOffice WebServer initially returns only an array of the primary keys for the base table, acquiring this information from the stored variables (originally loaded from the ini file when the application started) involves forming the following statement: SELECT DISTINCT TOP 100 MolTable.MOL_ID FROM MolTable WHERE MolTable.MolName Like "benz%.

When the search is performed, the connection information for the base table ("MolTable") is used to create the ADO CONNECTION. Since this search is relational only, there is no need to go to Chemfinder for structure information. The connection information is used to create a data connection via ADO by calling GetNewConnection(dbkey, formgroup, conn_name) within ChemOffice WebServer. With this function, all the connection information for the conn_name (in this case, "base_connection") is extracted and an ADODB.Connection object is created that opens a pipe to the database. Once the connection is established, a record set is created using the select statement sent to the datasource.

Since an array of baseids only is returned, each result form sends another select statement to retrieve a single record. This mode of operation by the Web server reduces the size of record sets on the server, which record sets can consume substantial resources. By seeking a full record set for a single record rather then for multiple (e.g., 100) records, the Web is, in general, utilized more efficiently.

In at least some cases, it is advantageous if each of the methods and procedures described above is implemented in HTML, Java™, ActiveX™, or another computer language that makes the resulting features fully accessible to an end-user who has a Web browser that is compatible with such a language. In a case in which one or more such computer languages are used, the new Web application can be derived quickly and accurately from the desktop application as long as a computer from which the desktop application can be accessed is able to run the compatible Web browser and connect to a Web site that supplies the methods and procedures.

The technique (i.e., the procedures described above) may be implemented in hardware or software, or a combination of both. In at least some cases, it is advantageous if the technique is implemented in computer programs executing on one or more programmable computers, such as a personal computer running or able to run an operating system such as Unaix®, Linux®, Microsoft® Windows® 95, 98, or NT, or MacIntosh® OS, that each include a processor, a storage medium readable by the processor (including volatile and non-volatile memory and/or storage elements), at least one input device such as a keyboard, and at least one output device. Program code is applied to data entered using the input device to perform the technique described above and to generate output information. The output information is applied to one or more output devices such as a display screen of the computer.

In at least some cases, it is advantageous if each program is implemented in a high level procedural or object-oriented programming language such as Perl, C, C++, or Java™ to communicate with a computer system. However, the programs can be implemented in assembly or machine language, if desired. In any case, the language may be a compiled or interpreted language.

In at least some cases, it is advantageous if each such computer program is stored on a storage medium or device, such as ROM or optical or magnetic disc, that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, the derived application may include an Internet based application that is suitable to be exercised via a portable communications device such as a pager, a personal digital assistant, a portable telephone, or a handheld computer. The database interaction information may be retrieved directly from the desktop application form file, perhaps in real time as a new application is being derived.

What is claimed is:

1. A method for use in deriving database interaction software, comprising:
   analyzing a first set of computer software data that specifies interaction with a database, the first set of computer software data being configured for use with existing application software that is capable of interacting with the database;
   deriving, from the first set of computer software data, a second set of computer software data for interacting with the database;
   in the second set of computer software data, creating new elements corresponding to elements used by the existing application software, the new elements being associated with corresponding portions of the database; and
   using the second set of computer software data to interact with the database independently of the first set of computer software data.

2. The method of claim 1, further comprising:
   producing a Web based application that relies on the second set of computer software data.

3. The method of claim 1, wherein the derivation of the second set of computer software data includes referring to an incomplete Web application.

4. The method of claim 1, wherein the derivation of the second set of computer software data includes deriving a Web based application from the second set of computer software data and an incomplete Web application.

5. The method of claim 1, further comprising:
   combining the second set of computer software data with an incomplete Web based application.

6. The method of claim 1, further comprising:
   deriving database interaction information from the first set of computer software data.

7. The method of claim 6, wherein the database interaction information includes an identification of a database record.

8. The method of claim 6, wherein the database interaction information includes an identification of a database field.

9. The method of claim 6, wherein the database interaction information includes information that allows a connection to be made to the database.

10. The method of claim 6, wherein the database interaction information includes user interface information.

11. The method of claim 10, wherein the user interface information includes an identification of a chemical structure window.

12. The method of claim 10, wherein the user interface information includes an identification of a molecular weight window.

13. The method of claim 10, wherein the user interface information includes an identification of a molecule name window.

14. The method of claim 10, wherein the user interface information includes an identification of a chemical formula window.

15. The method of claim 10, wherein the user interface information includes an identification of a chemical synonym window.

16. A method for use in deriving database interaction software, comprising:
   analyzing a first set of computer software data that specifies interaction with a database, the first set of computer software data being configured for use with existing application software that is capable of interacting with the database;
   deriving, from the first set of computer software data, a second set of computer software data for interacting with the database; and
   in the second set of computer software data, creating new elements corresponding to elements used by the existing application software, the new elements being associated with corresponding portions of the database;
   wherein the first and second sets of computer software data describe respective first and second forms for interacting with the database.

17. The method of claim 16, wherein the first and second forms include respective first and second form elements that are directed to the same set of information in the database.

18. The method of claim 16, further comprising:
   deriving a Web based application from the second set of computer software data and a template application.

19. The method of claim 18, wherein the template application supports a function that is not specified in the second set of computer software data.

20. The method of claim 18, wherein the template application supports a database search function.

21. The method of claim 18, wherein the template application supports a database data viewing function.

22. The method of claim 18, wherein the template application supports a database data entry function.

23. The method of claim 16, further comprising:
   producing a Web based application that relies on the second set of computer software data; and
   creating a Web link that refers to the Web based application.

24. The method of claim 16, further comprising:
   deriving, from the first set of computer software data, a text file that includes information for interacting with the database; and
   deriving the second set of computer software from the text file.

25. The method of claim 16, further comprising:
   deriving, from the first set of computer software data, positional information for an element of the first form.

26. The method of claim 16, fiber comprising:
   determining, from the first set of computer software data, a relationship between a base table and a subtable in the database.

27. The method of claim 16, further comprising:
   determining a relational link between fields in the database.

28. Computer software, residing on a computer-readable storage medium, comprising a set of instructions for use in a computer system to cause the computer system to derive database interaction software, the instructions causing the system to:
   analyze a first set of computer software data that specifies interaction with a database, the first set of computer software data being configured for use with existing application software that is capable of interacting with the database;
   derive, from the first set of computer software data, a second set of computer software data for interacting with the database;
   in the second set of computer software data, create new elements corresponding to elements used by the existing application software, the new elements being associated with corresponding portions of the database; and
   use the second set of computer software data to interact with the database independently of the first set of computer software data.

29. Computer software, residing on a computer-readable storage medium, comprising a set of instructions for use in a computer system to cause the computer system to derive database interaction software, the instructions causing the system to:
   analyze a first set of computer software data that specifies interaction with a database, the first set of computer software data being configured for use with existing application software that is capable of interacting with the database;
   derive, from the first set of computer software data, a second set of computer software data for interacting with the database; and
   in the second set of computer software data, create new elements corresponding to elements used by the existing application software, the new elements being associated with corresponding portions of the database;
   wherein the first and second sets of computer data describe respective first and second forms for interacting with the database.

30. A system for use in deriving database interaction software, comprising:
   an analyzer that analyzes a first set of computer software data that specifies interaction with a database, the first set of computer software data being configured for use with existing application software that is capable of interacting with the database;
   a deriver that derives, from the first set of computer software data, a second set of computer software data for interacting with the database;
   a creating mechanism that creates, in the second set of computer software data, new elements corresponding to elements used by the existing application software, the new elements being associated with corresponding portions of the database; and
   an interacter that uses the second set of computer software data to interact with the database independently of the first set of computer software data.

31. A system for use in deriving database interaction software, comprising:
   an analyzer that analyzes a first set of computer software data that specifies interaction with a database, the first set of computer software data being configured for use with existing application software that is capable of interacting with the database;
   a deriver that derives, from the first set of computer software data, a second set of computer software data for interacting with the database; and
   a creating mechanism that creates, in the second set of computer software data, new elements corresponding to elements used by the existing application software, the new elements being associated with corresponding portions of the database;
   wherein the first and second sets of computer software data describe respective first and second forms for interacting with the database.

* * * * *